US006952563B2

(12) United States Patent
Brown et al.

(10) Patent No.: US 6,952,563 B2
(45) Date of Patent: Oct. 4, 2005

(54) METHOD AND APPARATUS FOR ADAPTIVELY SETTING FREQUENCY CHANNELS IN A MULTI-POINT WIRELESS NETWORKING SYSTEM (75) Inventors: William M. Brown, San Marcos, CA (US); Robert S. Bell, Oceanside, CA (US)

(73) Assignee: Metric Systems, INC, Vista, CA (US)

( * ) Notice: Subject to any disclaimer, the term of this patent is extended or adjusted under 35 U.S.C. 154(b) by 810 days.

(21) Appl. No.: 09/921,517

(22) Filed: Aug. 1, 2001

(65) Prior Publication Data

US 2002/0019214 A1 Feb. 14, 2002

Related U.S. Application Data (60) Provisional application No. 60/222,693, filed on Aug. 2, 2000.

(51) Int. Cl.[7] .......................... H04B 17/00; H04B 1/00; H04Q 7/20
(52) U.S. Cl. .................... 455/67.11; 455/63; 455/452.2
(58) Field of Search .......................... 455/62, 63, 67.11, 455/69, 70, 71, 423, 452.2, 500, 515, 517, 450, 454, 464, 513

(56) References Cited

U.S. PATENT DOCUMENTS

| 5,203,012 A | * | 4/1993 | Patsiokas et al. ........... 455/513 |
| 5,276,908 A | * | 1/1994 | Koohgoli et al. ........... 455/454 |
| 5,345,597 A | * | 9/1994 | Strawczynski et al. ...... 455/450 |
| 5,428,819 A | * | 6/1995 | Wang et al. ................. 455/454 |
| 5,448,750 A | * | 9/1995 | Eriksson et al. .......... 455/452.2 |
| 5,655,217 A | | 8/1997 | Lemson ...................... 455/513 |
| 5,875,180 A | * | 2/1999 | Wiedeman et al. .......... 370/320 |
| 5,898,928 A | * | 4/1999 | Karlsson et al. ............ 455/450 |
| 6,052,596 A | * | 4/2000 | Barnickel ................... 455/450 |
| 6,163,698 A | | 12/2000 | Leitch et al. ............... 455/450 |
| 6,212,396 B1 | * | 4/2001 | Brown et al. ............... 455/464 |
| 6,233,229 B1 | | 5/2001 | Ranta et al. ................ 370/330 |
| 2003/0040277 A1 | * | 2/2003 | Deats .......................... 455/63 |

* cited by examiner

*Primary Examiner*—Benny Tieu
(74) *Attorney, Agent, or Firm*—Jerry R. Potts (57) ABSTRACT

In a wireless network with point-to-point, multi-point or broadcast communications links, a method is provided for adaptively setting frequency channels for wireless devices within the network by dynamically exchanging time-varying spectral maps and communication parameters to utilize available frequency channels efficiently.

48 Claims, 5 Drawing Sheets

METHOD AND APPARATUS FOR ADAPTIVELY SETTING FREQUENCY CHANNELS IN A MULTI-POINT WIRELESS NETWORKING SYSTEM

STATEMENT REGARDING FEDERALLY SPONSORED RESEARCH OR DEVELOPMENT

This invention was made with Government support under contract No. 65540-02-C-0068 entitled "Low Cost Implementation of High Density Wireless Networks" awarded by the Naval Surface Warfare Center. The Government has certain rights in this invention.

BACKGROUND OF THE INVENTION

1. Field of the Invention

The present invention relates to telecommunications, and more particularly, to wireless communications.

2. Background Art

Figure 1:
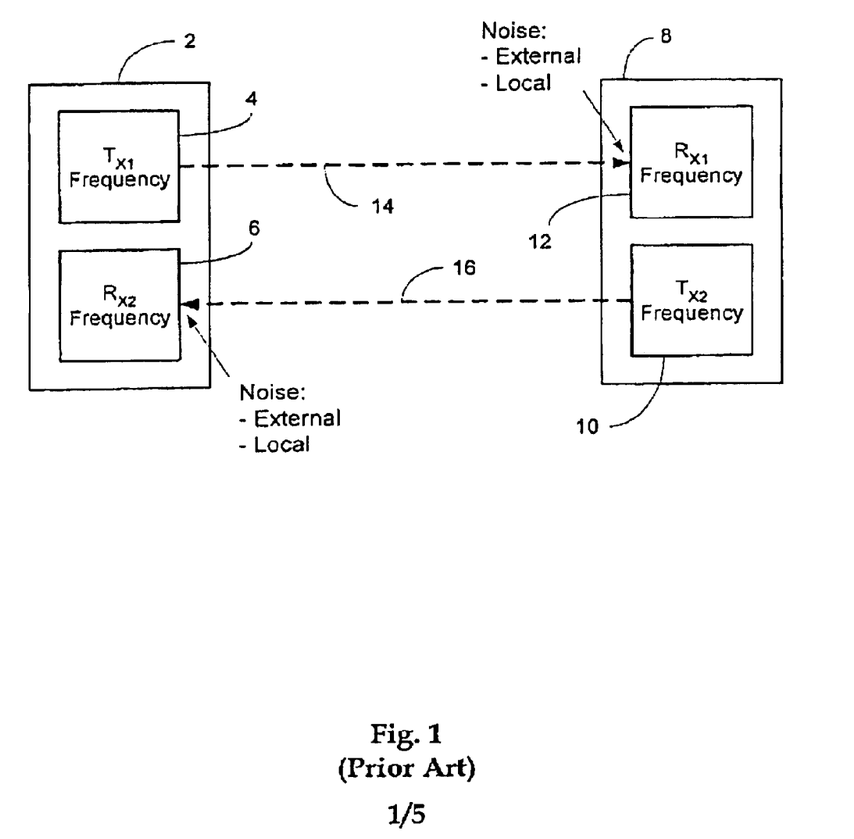
FIG. 1, described above, is a diagram of a typical point-to-point radio system with first and second wireless devices communicating through a bidirectional link.

A wireless telecommunications network is typically made up of a plurality of wireless devices forming point-to-point, multi-point or broadcast radio systems each using a set of frequencies to establish forward links and reverse links for bidirectional communications. A typical point-to-point radio system with two wireless devices capable of handling bidirectional communications traffic is illustrated in the diagram of FIG. 1. In FIG. 1, a first wireless device 2 comprises a radio frequency (RF) transmitter 4 and an RF receiver 6, while a second wireless device 8 comprises an RF transmitter 10 and an RF receiver 12. The RF transmitters and receivers in the wireless devices are capable of transmitting and receiving radio frequency signals at frequencies in one or more frequency bands.

When the transmitter 4 of the wireless device 2 transmits RF signals in a selected frequency channel, the receiver 12 in the second wireless device 8 need be tuned to that frequency channel to receive the RF signals transmitted by the transmitter 4 of the first wireless device 2. Similarly, the RF receiver 6 in the first wireless device 2 need be tuned to the frequency channel used by the transmitter 10 of the second wireless device 8. A frequency channel is usable for communications between the two wireless devices if it is permitted by government regulations, for example, regulations by the Federal Communications Commission (FCC) in the United States, and if the reception of RF signals is not significantly degraded by the presence of excessive external or local noise at the receivers of the wireless devices.

Bidirectional communications between two wireless devices in a point-to-point radio system may be characterized by either a simplex link or a full duplex link. In a simplex link, RF signals on the radio signal path 14 from the first wireless 2 to the second wireless device 8 and RF signals on the radio signal path 16 from the second wireless device 8 to the first wireless device 2 as illustrated in FIG. 1 utilize the same frequency at different times. In order to avoid interference in bidirectional communications utilizing the same frequency channel, internal or external means which are well known to a person skilled in the art are typically used to prevent simultaneous transmissions in conventional point-to-point radio systems with simplex links.

In a full duplex link, RF signals on the radio signal path 14 from the first wireless device 2 to the second wireless device 8 are transmitted using a frequency channel different from that which is used for the transmission of RF signals from the second wireless device 8 to the first wireless device 2 along the radio signal path 16. The frequency separation between the transmit frequencies of these two wireless devices is based upon various factors including, for example, the filtering and rejection capability of duplexers in the wireless devices, antenna separation if the transmit antenna is separate from the receive antenna of each wireless device, and digital signal processing capabilities of the wireless devices.

In a typical wideband full duplex system, two independent channels, each of a continuous bandwidth, are used to transmit signals between two wireless devices. The bandwidth of these channels can range from tens of kilohertz to hundreds of megahertz, and possibly very well into a gigahertz range in a very wide band RF system. In a typical wideband full duplex system, the spectral locations of the transmit and receive channels for each of the wireless devices are usually determined by a combination of factors, including government regulations and practical considerations.

If a radio system is used for operations in one or more unlicensed radio bands, wide segments of the radio bands may be allocated for general operations if no interference is present in these bands. The unlicensed bands are in turn subdivided into individual transmit and receive channels. In a typical scenario, the individual transmit and receive channels are allocated base upon an a priori determination of frequency separation required to reduce self-interference between the transmitters and receivers of wireless devices.

Because of predetermined frequency channel allocation, wireless devices in conventional radio systems are not afforded the capability of dynamically selecting open channels by finding and using locally non-interfering band segments within a larger allocated band for establishing and maintaining bidirectional radio communications. It is typical that the noise signature for a given frequency band may vary from time to time. Furthermore, it is typical in an unlicensed radio band that a frequency channel may be clear and available at a given time but occupied by another communications link at another time.

Therefore, there is a need for a method of establishing and maintaining communications links between wireless devices by adaptively setting frequency channels in one or more frequency bands in a wireless communications network with point-to-point, multi-point or broadcast links.

BRIEF DESCRIPTION OF THE DRAWINGS

The present invention will be described with respect to particular embodiments thereof, and references will be made to the drawings in which.

DETAILED DESCRIPTION

One of the major limitations on the availability of radio frequency (RF) channels to wireless devices in telecommunication systems is RF noise. The noise present at the receiver of a wireless device typically includes contributions from various sources, such as noise generated by other local RF devices and noise received from distant sources. The presence of excessive noise reduces the overall system reliability and the speed of the link in a given frequency channel even if the channel is otherwise available.

Figure 2A:
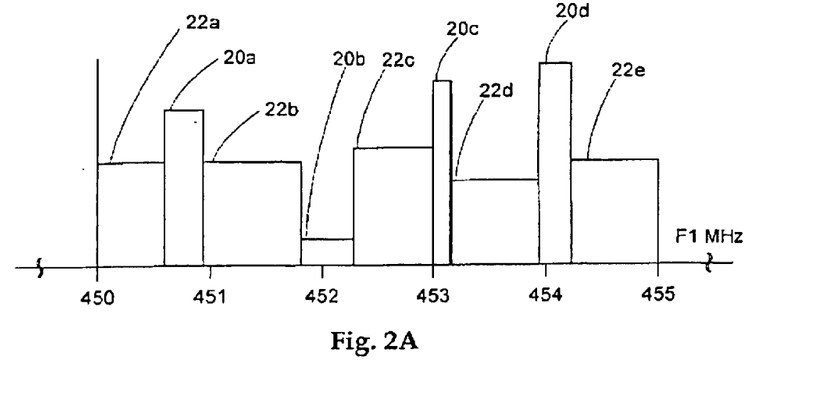
FIGS. 2A and 2B illustrate examples of spectral maps of available and unavailable frequency channels of a given band for the first and second wireless devices, respectively.
Figure 2B:
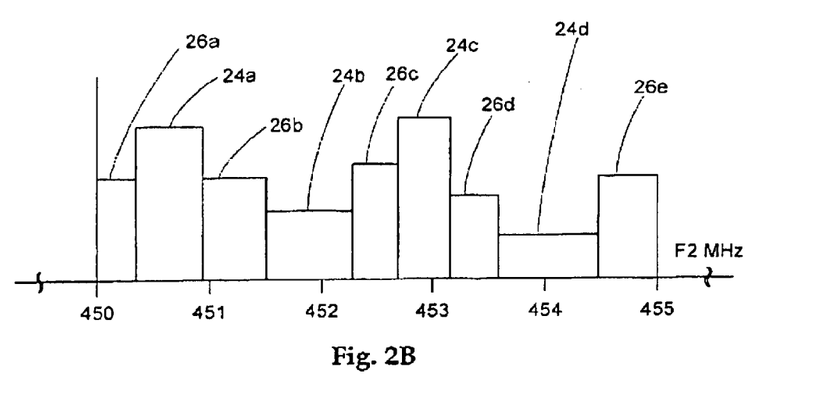

FIGS. 2A and 2B illustrate examples of spectral maps for RF reception by first and second wireless devices, respectively, in a point-to-point radio system. In these examples, it is assumed that 5 MHz of RF spectrum is available in an RF band between 450 MHz and 455 MHz. The first wireless device scans the RF spectrum between 450 MHz and 455 MHz and produces a spectral map as illustrated in FIG. 2A, showing segments 20a, 20b, 20c and 20d of the spectrum which are unavailable for RF reception by the first wireless device because of excessive noise present in these band segments, or because of other reasons.

The presence of other signals in a frequency channel used by an existing communications link may preclude that frequency channel from being used for RF reception by the first wireless device, for example. The remaining spectral segments 22a, 22b, 22c, 22d and 22e in the frequency band between 450 MHz and 455 MHz as illustrated in the spectral map of FIG. 2A are locally available for RF reception by the first wireless device.

FIG. 2B shows an example of a spectral map for RF reception by the second wireless device in the frequency range of 450 MHz to 455 MHz. After scanning the spectrum between 450 MHz and 455 MHz, the second wireless device produces a spectral map which shows segments 24a, 24b, 24c and 24d of the frequency band that are unavailable for RF reception by the second wireless device because of the presence of excessive noise or other signals in existing communications links, and remaining segments 26a, 26b, 26c, 26d and 26e of the frequency band that are available for RF reception by the second wireless device. If the first and second wireless devices are located at sites distant from each other, it is not unusual that the spectral map produced by the first wireless device is different from the spectral map produced by the second wireless device.

If bidirectional communications between the first and second wireless devices are achieved by using a simplex link, the same transmit frequency used by both the first and second wireless devices need be located in an available band segment of each of the spectral maps. If bidirectional communications between the first and second wireless devices are achieved by using a full duplex link, the transmit frequencies of the first and second wireless devices are different. The transmit frequency of the second wireless device need be in one of the available band segments 22a, 22b, 22c, 22d and 22e in the spectral map of FIG. 2A, whereas the transmit frequency of the first wireless device need be in one of the available band segments 26a, 26b, 26c, 26d and 26e of the spectral map of FIG. 2B.

Figure 3:
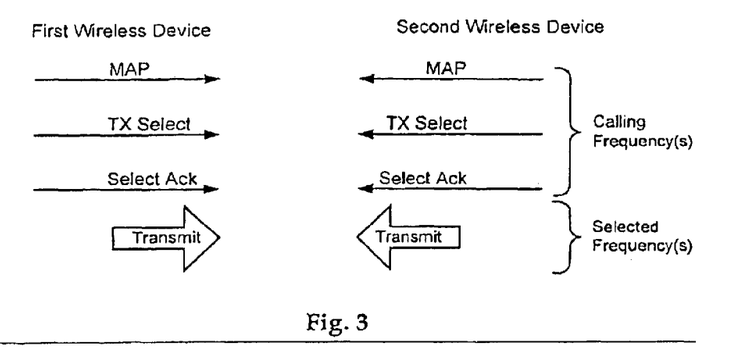
FIG. 3 illustrates the use of calling frequencies to transfer spectral maps between the first and second wireless devices to establish a bidirectional communications link.

FIG. 3 shows a scheme of exchanging the spectral maps between the first and second wireless devices and selecting the transmit frequencies by the first and second wireless devices, using a known calling frequency which may be inside or outside of the frequency band as shown in FIGS. 2A and 2B for bidirectional communications. The data for the spectral map produced by the first wireless device is modulated into a calling signal at the calling frequency. The calling signal may use any of the well known modulation formats with a high processing gain. If necessary, the calling signal may be generated with a sufficiently high processing gain at the expense of data speed, such that the signal is very likely to be received by the second wireless device even a noisy environment.

The calling signal transmitted by the first wireless device carries a map of the useable portions of the spectrum available for RF reception at the location of the first wireless device, to indicate to the second wireless device the ranges of transmit frequencies available for the second wireless device to communicate with the first wireless device. The first wireless device also listens for a calling signal from other wireless devices including the second wireless device.

Upon receiving the spectral map indicating the usable portions of the frequency spectrum from the first wireless device, the second wireless device sends its spectral map indicating usable portions of the spectrum available for RF reception at the location of the second wireless device to the first wireless device, also using a known calling frequency. The calling frequency used by the second wireless device may be the same as or different from the calling frequency used by the first wireless device. The calling signal carrying the spectral map indicating the usable portions of the frequency spectrum available for RF reception by the second wireless device is also transmitted to the first wireless device with a high processing gain, at the expense of data speed if necessary, such that the signal is very likely to be received by the first wireless device even in a noisy environment.

After the first and second wireless devices receive respective spectral maps from each other, transmit frequencies are selected by the first and second wireless devices employing a full duplex link. Subsequently, messages carrying the selected transmit frequencies are generated and transmitted to opposite devices. The receivers of the first and second wireless devices are tuned to the transmit frequencies of one another to establish bidirectional communications links. After both the first and second wireless devices are ready for exchanging signals through the established communications links, messages carrying acknowledgements of the selected transmit frequencies are sent to each other to confirm the selected transmit frequencies for the bidirectional links.

The noise levels present in different segments of a frequency spectrum may change from time to time. It is also possible that the availability of frequency channels for a communications link between the first and second wireless devices may change over time because another device in the system may occupy a previously unused frequency channel. It is also possible that an unavailable frequency channel may become available because a communications link occupying that channel has been dropped, or because the noise within that channel has been reduced to an acceptable level. Therefore, it is usually expected that the spectral map of available frequency segments in a given spectrum for a given wireless device would vary from time to time.

In order to provide continuous coverage, the scanning receiver of each of the wireless devices continuously monitors the spectrum at each location. Furthermore, a set of quality parameters may be monitored to verify ongoing communications through existing communications links and the quality of service of the existing links. The quality parameters may include the bit error rate (BER), correlation time, block errors, for example, if data are exchanged through the bidirectional communications links using well known modulation schemes, such as orthogonal frequency division multiplex or spread spectrum, to customize a set of subcarriers or band segments and place them in contiguous or non-contiguous spectrum slots, to allow the communications links to utilize the available bandwidths efficiently and to enhance the signal-to-noise ratios of the receivers. The increased bandwidth efficiency and signal noise ratio would in turn provide an increase in usable data throughput of the communications links. In an embodiment, the quality parameters for verifying the ongoing communications between the wireless devices and the quality of service are exchanged as link level data between the devices.

Figure 4:
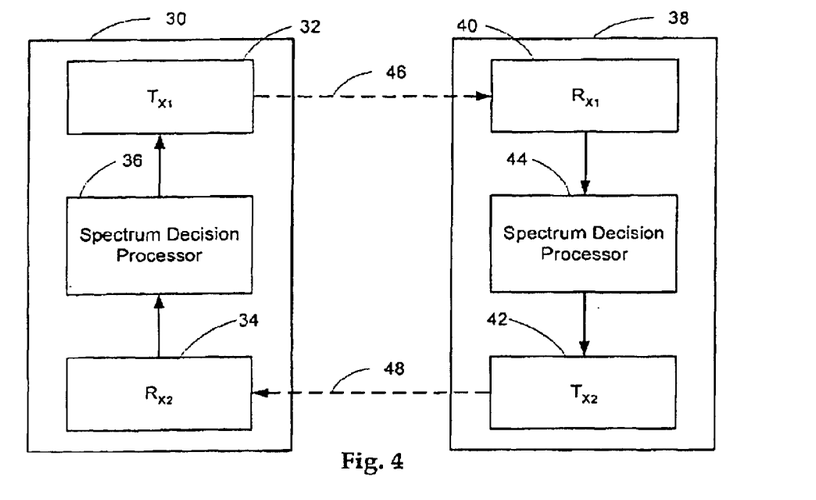
FIG. 4 illustrates two wireless devices each having a spectrum decision processor to determine available frequency channels within a frequency band based upon measured noise and signal levels.

FIG. 4 shows a diagram illustrating a point-to-point radio system including first and second wireless devices 30 and 38 each equipped with a spectrum decision processor for determining available frequency channels within a frequency spectrum based upon measurements of noise and signals by scanning across the spectrum. In FIG. 4, the first wireless device 30 comprises a transmitter 32, a receiver 34 and a spectrum decision processor 36 connected between the receiver 34 and the transmitter 32. In an embodiment, the receiver 34 comprises a scan logic adaptive receiver capable of scanning across one or more operating RF bands and measuring the RF energy in each incremental frequency sample. The measurements may include the noise floor, the average noise level and the peak energy of signals at different sampling points within the spectrum. The spectrum decision processor 36 then determines the available frequency channels in the spectrum based upon the measurements of noise and signal energy.

If the noise is excessive or if other signals are present in a given band segment, then that band segment is deemed to be unavailable for a unidirectional communications link from the second wireless device to the first wireless device. In an embodiment, the spectrum decision processor 36 also computes a spectral signature for the available frequency channels within the given frequency band and establishes far-end communication parameters for the second wireless device.

In a further embodiment, the spectrum decision processor 36 partitions the available band segments into sectors grouped to meet specific note link demands for different types of links, for example, point-to-point, multi-point, or broadcast links. The communication parameters established by the spectrum decision processor 36 are transmitted to the second wireless device by the RF transmitter 32 of the first wireless device 30. In a similar manner, the second wireless device 38 comprises a receiver 40, a transmitter 42, and a spectrum decision processor 44 connected between the receiver 40 and the transmitter 44. Bidirectional links are established between the first and second wireless devices 30 and 38 through RF signal paths 46 and 48.

Figure 5:
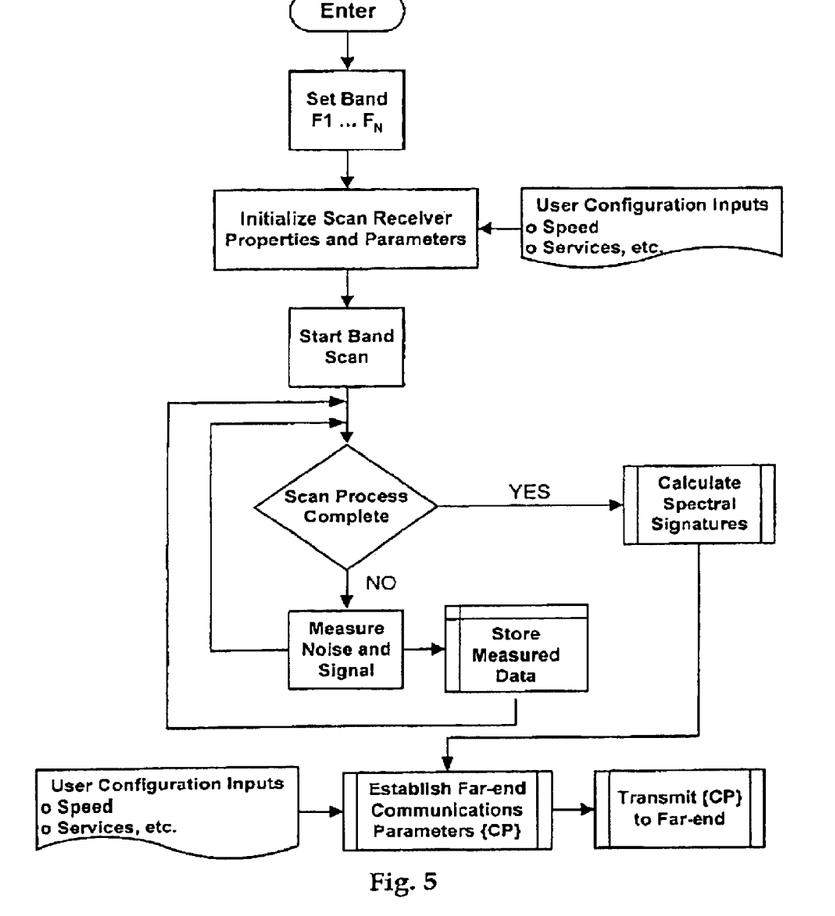
FIG. 5 shows a flow chart illustrating a method of establishing communications according to an embodiment of the present invention.

FIG. 5 shows a flow chart illustrating an embodiment of a method for establishing communications between a plurality of wireless devices in a radio network, from the point of view of one of the wireless devices. The wireless device first sets one or more frequency bands $F_1 \ldots F_n$ for scanning by the RF receiver of the wireless device. The wireless device then initializes its scan receiver parameters to allow its spectrum decision processor to determine which band segments are available for RF reception based upon the scan receiver properties and parameters. In an embodiment, user configuration inputs such as the desired data speed and the type of service are entered into the spectrum decision processor of the wireless device. Scanning of the frequency bands starts after the scan receiver properties and parameters are initialized.

In an embodiment, scanning of a given frequency band is achieved by starting at the lower limit of the frequency band and taking measured samples of signal and noise in small increments of frequency until the upper limit of the frequency band is reached. At each sampling point, the noise level and the signal characteristics are measured. The measured noise and signal data at each sampled frequency are stored in a memory. The measurements are repeated during the scanning of the frequency band until measured data for all of the sampled frequencies within the frequency band are collected.

Based upon these measured data, the spectrum decision processor determines the availability of frequency channels within the band and computes a spectral signature for the available frequency channels. The determination of whether a particular frequency channel is available also depends upon the user's desired data speed and type of wireless service, for example. In an embodiment, the spectral signature for the available frequency channels of the first wireless device is compared with the user configuration inputs to generate far-end communication parameters $\{C_p\}$ for the second wireless device to establish a unidirectional link to transmit data-carrying signals to the first wireless device.

The transmitter of the first wireless device transmits the far-end communication parameters $\{C_p\}$ to the second wireless device using a known calling frequency. In a similar manner, the second wireless device performs a scan of the frequency band and generates its own far-end communication parameters for the first wireless device to establish a unidirectional link to transmit data-carrying signals to the second wireless device. These communications parameters are transmitted from the second wireless device to the first wireless device using a known calling frequency. Multipoint links and broadcast links may be established in a similar manner by transmitting desired far-end communication parameters to other wireless devices within a wireless network.

Because the measured noise levels and the availability of frequency channels within a given frequency band may vary from time to time, the process as illustrated in FIG. 5 may be repeated to allow the spectrum decision processor to dynamically track the availability of band segments within the given frequency band and the time-varying spectral signature for the given frequency band. The communication parameters $\{C_p\}$ may also change over time in response to the measured data. Updated communication parameters may be transmitted from the first wireless device to the second wireless device periodically to allow the second wireless device to set its transmit frequency channel adaptively in response to the changed signal and noise environment for the first wireless device.

In a similar manner, the transmit frequency channel of the first wireless device may be set adaptively in response to receiving updated communication parameters from the second wireless device. Communication parameters with periodic updates may be exchanged between the first and second wireless devices in a point-to-point link, or with additional wireless devices in multi-point or broadcast links, as link level data using a modulation format well known to a person skilled in the art.

Figure 6:
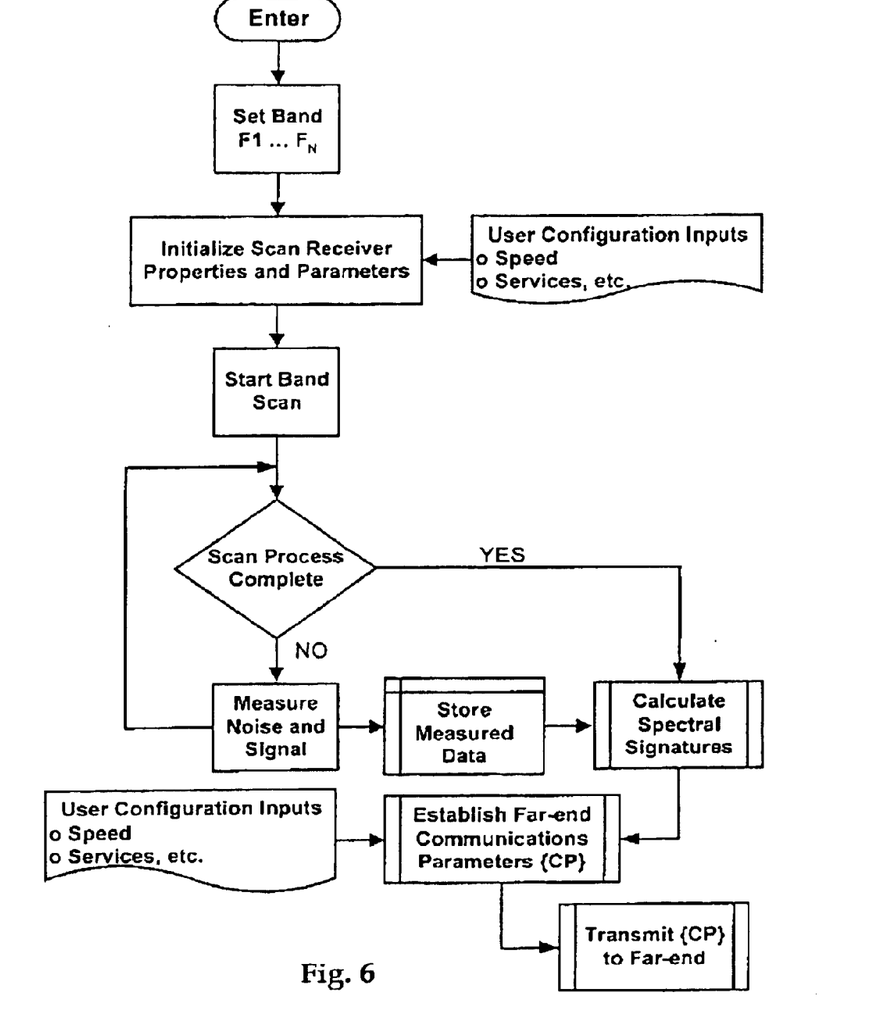
FIG. 6 shows a flow chart illustrating a method of establishing communications according to another embodiment of the present invention.

FIG. 6 shows a flow chart illustrating another embodiment of the method for establishing communications similar to the process illustrated in FIG. 5, with a slight variation in that the measured data stored in the memory for each sampled frequency are transmitted directly to the spectrum decision processor for calculating the spectral signature. The spectral signature for each small band segment within a given frequency band may be completed before the scanning process for the entire frequency band is completed. The communication parameters $\{C_p\}$ for each small band segment available for RF reception by the first wireless device may be established and transmitted to the second wireless device before the entire frequency band is scanned, and vice versa.

In an embodiment, the spectrum decision processor in each of the wireless devices may also be programmed to anticipate moves by government agencies such as the FCC in the United States to seek and implement new and advanced band utilization techniques and modulation schemes. With advanced coding schemes that have the effect of harvesting underutilized frequency spectrum, it is possible to have multiple services to co-exist within a given frequency range. The determination of the available frequency channels and the establishment of far-end communication parameters for multi-point links in a wireless network may be based upon factors reflecting these advanced band utilization techniques and modulation schemes.

The present invention has been described with respect to particular embodiments thereof, and numerous modifications can be made which are within the scope of the invention as set forth in the claims.

What is claimed is:

1. A method of establishing communications between a plurality of wireless devices including at least a first wireless device and a second wireless device, the method comprising the steps of:
   (a) scanning, by the first wireless device, a given frequency band for receiving a radio signal, comprising the steps of:
      (a1) measuring noise at a plurality of frequencies within the given frequency band;
      (a2) measuring signals at a plurality of frequencies within the given frequency band to determine whether any of the frequencies within the given frequency band is used by an existing communication link;
      (a3) determining available frequency channels within the given frequency band based upon the steps of measuring the noise and measuring the signals;
   (b) computing a spectral signature for the available frequency channels within the given frequency band;
   (c) establishing far-end communication parameters for the second wireless device; and
   (d) transmitting the far-end communication parameters to the second wireless device.

2. The method of claim 1, further comprising the step of setting a plurality of frequency bands for scanning by the first wireless device.

3. The method of claim 1, further comprising the step of initializing scan receiver parameters by the first wireless device prior to the step of scanning the given frequency band.

4. The method of claim 3, wherein the step of initializing scan receiver parameters comprises the step of receiving at least one user configuration input.

5. The method of claim 4, wherein said at least one user configuration input includes data speed and type of service.

6. The method of claim 4, wherein the step of establishing far-end communication parameters comprises the step of comparing the spectral signature for the available frequency channels with said at least one user configuration input.

7. The method of claim 1, wherein the step of measuring the noise comprises the steps of measuring a noise floor and measuring an average noise level over the given frequency band.

8. The method of claim 1, wherein the communication parameters include a map of the available frequency channels within the given frequency band.

9. The method of claim 8, wherein the communication parameters further include quality parameters.

10. The method of claim 9, wherein the quality parameters include a bit error rate (BER).

11. The method of claim 9, wherein the quality parameters include a correlation time.

12. The method of claim 9, wherein the quality parameters include block errors.

13. The method of claim 1, wherein the step of transmitting the communication parameters to the second wireless device comprises the step of transmitting a calling signal carrying the communication parameters over a given calling frequency.

14. The method of claim 13, wherein the step of transmitting the calling signal over the given calling frequency comprises the step of transmitting the calling signal with a high processing gain, the calling signal receivable by the second wireless device in a noisy environment.

15. The method of claim 1 for continually maintaining communications between the first wireless device and the second wireless device, comprising the steps of repeating steps (a)–(d) to transmit time-varying communication parameters from the first wireless device to the second wireless device.

16. The method of claim 1, further comprising the steps of:
   (e) receiving, by the second wireless device, the communication parameters from the first wireless device;
   (f) scanning, by the second wireless device, a given frequency band for receiving a radio signal, comprising the steps of:
      (f1) measuring noise at a plurality of frequencies within the given frequency band;
      (f2) measuring signals at a plurality of frequencies within the given frequency band to determine whether any of the frequencies within the given frequency band is used by an existing communication link;
      (f3) determining a second plurality of available frequency channels within the given frequency band based upon the steps of measuring the noise and measuring the signals;
   (g) computing, by the second wireless device, a second spectral signature for the second plurality of available frequency channels within the given frequency band;
   (h) establishing, by the second wireless device, a second plurality of far-end communication parameters for the first wireless device; and
   (i) transmitting, by the second wireless device, the second plurality of far-end communication parameters to the first wireless device.

17. The method of claim 16 for continually maintaining communications between the first wireless device and the second wireless device, comprising the steps of repeating steps (e)–(i) to exchange time-varying communication parameters between the first wireless device and the second wireless device.

18. The method of claim 17, wherein the communication parameters are exchanged between the first wireless device and the second wireless device as link level data.

19. The method of claim 1 for establishing communications between the first wireless device and a third wireless device, further comprising the steps of:

(e) scanning, by the first wireless device, a given frequency band for receiving a radio signal, comprising the steps of:
  (e1) measuring noise at a plurality of frequencies within the given frequency band;
  (e2) measuring signals at a plurality of frequencies within the given frequency band to determine whether any of the frequencies within the given frequency band is used by an existing communication link;
  (e3) determining available frequency channels for the third wireless device within the given frequency band based upon the steps of measuring the noise and measuring the signals;
(f) computing a spectral signature for the available frequency channels for the third wireless device within the given frequency band;
(g) establishing far-end communication parameters for the third wireless device; and
(h) transmitting the far-end communication parameters to the third wireless device.

20. A method of establishing communications between a plurality of wireless devices including at least a first wireless device and a second wireless device, the method comprising the steps of:
  (a) scanning, by the first wireless device, a given frequency band for receiving a radio signal, comprising the steps of:
    (a1) measuring noise at a plurality of frequencies within the given frequency band;
    (a2) measuring signals at a plurality of frequencies within the given frequency band to determine whether any of the frequencies within the given frequency band is used by an existing communication link;
    (a3) determining a first plurality of available frequency channels within the given frequency band based upon the steps of measuring the noise and measuring the signals;
  (b) computing, by the first wireless device, a first spectral signature for the first plurality of available frequency channels within the given frequency band;
  (c) establishing, by the first wireless device, a first plurality of far-end communication parameters for the second wireless device;
  (d) transmitting, by the first wireless device, the first plurality of far-end communication parameters to the second wireless device;
  (e) receiving, by the second wireless device, the first plurality of far-end communication parameters from the first wireless device;
  (f) scanning, by the second wireless device, a given frequency band for receiving a radio signal, comprising the steps of:
    (f1) measuring noise at a plurality of frequencies within the given frequency band;
    (f2) measuring signals at a plurality of frequencies within the given frequency band to determine whether any of the frequencies within the given frequency band is used by an existing communication link;
    (f3) determining a second plurality of available frequency channels within the given frequency band based upon the steps of measuring the noise and measuring the signals;
  (g) computing, by the second wireless device, a second spectral signature for the second plurality of available frequency channels within the given frequency band;
  (h) establishing, by the second wireless device, a second plurality of far-end communication parameters for the first wireless device; and
  (i) transmitting, by the second wireless device, the second plurality of far-end communication parameters to the first wireless device.

21. The method of claim 20, further comprising the step of setting a plurality of frequency bands for scanning by the first wireless device.

22. The method of claim 20, further comprising the step of initializing scan receiver parameters by the first wireless device prior to the step of scanning the given frequency band by the first wireless device.

23. The method of claim 22, wherein the step of initializing scan receiver parameters by the first wireless device comprises the step of receiving at least one user configuration input by the first wireless device.

24. The method of claim 23, wherein said at least one user configuration input includes data speed and type of service.

25. The method of claim 23, wherein the step of establishing the first plurality of far-end communication parameters by the first wireless device comprises the step of comparing the first spectral signature for the first plurality of available frequency channels with said at least one user configuration input.

26. The method of claim 20, wherein the step of measuring the noise by the first wireless device comprises the steps of measuring a noise floor and measuring an average noise level over the given frequency band by the first wireless device, and wherein the step of measuring the noise by the second wireless device comprises the steps of measuring a noise floor and measuring an average noise level over the given frequency band by the second wireless device.

27. The method of claim 20, wherein the communication parameters for the first and second wireless devices include first and second maps of the available frequency channels within the given frequency band, respectively.

28. The method of claim 27, wherein the communication parameters further include quality parameters.

29. The method of claim 28, wherein the quality parameters include a bit error rate (BER).

30. The method of claim 28, wherein the quality parameters include a correlation time.

31. The method of claim 28, wherein the quality parameters include block errors.

32. The method of claim 20, wherein the step of transmitting the first plurality of communication parameters by the first wireless device to the second wireless device comprises the step of transmitting a first calling signal carrying the first plurality of communication parameters over a first calling frequency, and wherein the step of transmitting the second plurality of communication parameters by the second wireless device to the first wireless device comprises the step of transmitting a second calling signal carrying the second plurality of communication parameters over a second calling frequency.

33. The method of claim 20 for continually maintaining communications between the first wireless device and the second wireless device, comprising the steps of repeating steps (a)–(i) to exchange time-varying communication parameters between the first wireless device and the second wireless device.

34. The method of claim 20, wherein the communication parameters are exchanged between the first wireless device and the second wireless device as link level data.

35. The method of claim 20 for establishing communications between the first wireless device and a third wireless device, further comprising the steps of:

(j) scanning, by the first wireless device, a given frequency band for receiving a radio signal, comprising the steps of:
   (j1) measuring noise at a plurality of frequencies within the given frequency band;
   (j2) measuring signals at a plurality of frequencies within the given frequency band to determine whether any of the frequencies within the given frequency band is used by an existing communication link;
   (j3) determining available frequency channels for the third wireless device within the given frequency band based upon the steps of measuring the noise and measuring the signals;
(k) computing, by the first wireless device, a spectral signature for the available frequency channels for the third wireless device within the given frequency band;
(l) establishing, by the first wireless device, far-end communication parameters for the third wireless device; and
(m) transmitting, by the first wireless device, the far-end communication parameters to the third wireless device.

36. A method of establishing communications between a plurality of wireless devices including at least a first wireless device and a second wireless device, the method comprising the steps of:
(a) setting a plurality of frequency bands for scanning by the first wireless device;
(b) initializing scan receiver parameters by the first wireless device;
(c) scanning, by the first wireless device, a given frequency band for receiving a radio signal, comprising the steps of:
   (c1) measuring noise at a plurality of frequencies within the given frequency band;
   (c2) measuring signals at a plurality of frequencies within the given frequency band to determine whether any of the frequencies within the given frequency band is used by an existing communication link;
   (c3) determining a first plurality of available frequency channels within the given frequency band based upon the steps of measuring the noise and measuring the signals;
(d) computing, by the first wireless device, a first spectral signature for the first plurality of available frequency channels within the given frequency band;
(e) establishing, by the first wireless device, a first plurality of far-end communication parameters for the second wireless device;
(f) transmitting, by the first wireless device, the first plurality of far-end communication parameters to the second wireless device;
(g) receiving, by the second wireless device, the first plurality of far-end communication parameters from the first wireless device;
(h) scanning, by the second wireless device, a given frequency band for receiving a radio signal, comprising the steps of:
   (h1) measuring noise at a plurality of frequencies within the given frequency band;
   (h2) measuring signals at a plurality of frequencies within the given frequency band to determine whether any of the frequencies within the given frequency band is used by an existing communication link;
   (h3) determining a second plurality of available frequency channels within the given frequency band based upon the steps of measuring the noise and measuring the signals;
(i) computing, by the second wireless device, a second spectral signature for the second plurality of available frequency channels within the given frequency band;
(j) establishing, by the second wireless device, a second plurality of far-end communication parameters for the first wireless device;
(k) transmitting, by the second wireless device, the second plurality of far-end communication parameters to the first wireless device; and
(l) continually maintaining communications between the first wireless device and the second wireless device, comprising the steps of:
   repeating steps (c)–(f) to transmit time-varying communication parameters from the first wireless device to the second wireless device; and
   repeating steps (h)–(k) to transmit time-varying communication parameters from the second wireless device to the first wireless device.

37. The method of claim 36, wherein the step of initializing scan receiver parameters by the first wireless device comprises the step of receiving at least one user configuration input by the first wireless device.

38. The method of claim 37, wherein said at least one user configuration input includes data speed and type of service.

39. The method of claim 37, wherein the step of establishing the first plurality of far-end communication parameters by the first wireless device comprises the step of comparing the first spectral signature for the first plurality of available frequency channels with said at least one user configuration input.

40. The method of claim 36, wherein the step of measuring the noise by the first wireless device comprises the steps of measuring a noise floor and measuring an average noise level over the given frequency band by the first wireless device, and wherein the step of measuring the noise by the second wireless device comprises the steps of measuring a noise floor and measuring an average noise level over the given frequency band by the second wireless device.

41. The method of claim 36, wherein the communication parameters for the first and second wireless devices include first and second maps of the available frequency channels within the given frequency band, respectively.

42. The method of claim 41, wherein the communication parameters further include quality parameters.

43. The method of claim 42, wherein the quality parameters include a bit error rate (BER).

44. The method of claim 42, wherein the quality parameters include a correlation time.

45. The method of claim 42, wherein the quality parameters include block errors.

46. The method of claim 36, wherein the step of transmitting the first plurality of communication parameters by the first wireless device to the second wireless device comprises the step of transmitting a first calling signal carrying the first plurality of communication parameters over a first calling frequency, and wherein the step of transmitting the second plurality of communication parameters by the second wireless device to the first wireless device comprises the step of transmitting a second calling signal carrying the second plurality of communication parameters over a second calling frequency.

47. The method of claim 36, wherein the communication parameters are exchanged between the first wireless device and the second wireless device as link level data.

48. The method of claim 36 for establishing communications between the first wireless device and a third wireless device, further comprising the steps of:

(m) scanning, by the first wireless device, a given frequency band for receiving a radio signal, comprising the steps of:
   (m1) measuring noise at a plurality of frequencies within the given frequency band;
   (m2) measuring signals at a plurality of frequencies within the given frequency band to determine whether any of the frequencies within the given frequency band is used by an existing communication link;
   (m3) determining available frequency channels for the third wireless device within the given frequency band based upon the steps of measuring the noise and measuring the signals;

(n) computing, by the first wireless device, a spectral signature for the available frequency channels for the third wireless device within the given frequency band;

(o) establishing, by the first wireless device, far-end communication parameters for the third wireless device; and (p) transmitting, by the first wireless device, the far-end communication parameters to the third wireless device.

* * * * *